United States Patent [19]

Kikuchi et al.

[11] Patent Number: 5,291,930
[45] Date of Patent: Mar. 8, 1994

[54] PNEUMATIC RADIAL TIRES INCLUDING FIBER/RESIN BELT CORDS HAVING ELLIPTICAL OR RECTANGULAR CROSS-SECTIONAL SHAPE

[75] Inventors: Michitsugu Kikuchi, Mitaka; Norio Inada; Shizuo Iwasaki, both of Kodaira, all of Japan

[73] Assignee: Bridgestone Corporation, Tokyo, Japan

[21] Appl. No.: 10,449

[22] Filed: Jan. 25, 1993

Related U.S. Application Data

[63] Continuation of Ser. No. 758,069, Sep. 12, 1991, abandoned.

[30] Foreign Application Priority Data

Sep. 12, 1990 [JP] Japan .................. 2-240092

[51] Int. Cl.$^5$ .................. B60C 9/00; B60C 9/18
[52] U.S. Cl. .................. 152/451; 152/527; 156/180
[58] Field of Search .................. 152/185, 196–197, 152/451, 516, 526, 527, 556; 156/166, 180–181; 428/294–295, 375, 396, 902; 19/0.46; 28/220, 178

[56] References Cited

U.S. PATENT DOCUMENTS

| | | | |
|---|---|---|---|
| 2,689,813 | 9/1954 | Lawrence | 156/180 |
| 3,431,962 | 3/1969 | Kersker et al. | 152/556 |
| 3,508,990 | 4/1970 | Marzocchi | 428/396 X |
| 3,635,879 | 1/1972 | Baer et al. | 428/375 X |
| 3,667,529 | 6/1972 | Mirtain | 152/527 |
| 4,216,856 | 8/1980 | Moring et al. | 156/181 X |
| 4,328,324 | 5/1982 | Kock et al. | 152/451 X |
| 4,673,014 | 6/1987 | Markow | 152/516 X |
| 4,733,708 | 3/1988 | Kindry et al. | 152/527 |
| 4,793,131 | 12/1988 | Mizuno et al. | |
| 4,794,966 | 1/1989 | Markow | 152/516 |

FOREIGN PATENT DOCUMENTS

| | | | |
|---|---|---|---|
| 0101400 | 2/1984 | European Pat. Off. | 152/516 |
| 0225391 | 6/1987 | European Pat. Off. | |
| 0350944 | 1/1990 | European Pat. Off. | |
| 0420333 | 4/1991 | European Pat. Off. | 152/451 |
| 1480965 | 1/1970 | Fed. Rep. of Germany | 152/451 |
| 2620979 | 9/1988 | France | |
| 60-85001 | 5/1985 | Japan | 152/451 |
| 63-134310 | 6/1988 | Japan | 152/451 |
| 63-151505 | 6/1988 | Japan | |
| 1266231 | 10/1989 | Japan | 156/180 |
| 2-57405 | 2/1990 | Japan | |

OTHER PUBLICATIONS

Translation of Japanese Patent 63-134310, Jun. 6, 1988, Yokohama Rubber Co., Ltd.

*Primary Examiner*—Michael W. Ball
*Assistant Examiner*—Adrienne C. Johnstone
*Attorney, Agent, or Firm*—Sughrue, Mion, Zinn, Macpeak & Seas

[57] ABSTRACT

A pneumatic radial tire including one or more belt layers, wherein cords are used as cords for reinforcing at least one belt layer. These cords are formed by impregnating and attaching a resin having a modulus in tension of not more than 150 kg/mm$^2$ to bundles of cord-like fibers composed of a number of filaments having a tensile strength of not less than 15 g/d and a fineness of 1–15 deniers, an impregnated and attached amount of the filaments being in a range of 30% to 70 wt % relative to a weight of the filaments, and each of the cords has an elliptical or rectangular cross-section shape having an aspect ratio of a major axis (b)/a minor axis (a) being 1.5 to 5. Each of the bundles of the fibers are not twisted.

2 Claims, No Drawings

PNEUMATIC RADIAL TIRES INCLUDING FIBER/RESIN BELT CORDS HAVING ELLIPTICAL OR RECTANGULAR CROSS-SECTIONAL SHAPE

This is a continuation of application Ser. No. 07/758,069 filed Sep. 12, 1991 now abandoned.

BACKGROUND OF THE INVENTION (1) Field of the Invention

The present invention relates to pneumatic radial tires. More particularly, the invention relates to pneumatic radial tires having high speed performances, flexural fatigue resistance and cornering stability improved.

(2) Related Art Statement

Since pneumatic radial tires have improved cornering stability, high speed durability and wear resistance as compared to conventional bias tires owing to the radial structure, the radial tires have become popularized.

In general, the radial tire has the structure in which a carcass having cords arranged in radial directions of the tire is held by a pair of beads and a belt surrounds the carcass. The belt consists of two or more cord layers having cords arranged at an angle of 10° to 30° with respect to a circumferential direction of the tire. The carcass is constituted by one or two plies having carcass cords arranged at substantially 90° with respect to the circumferential direction.

The carcass and the belt have an important role to keep strength of the radial tire together with the bead portions. A primary feature of the radial tire lies in the belt and the carcass. The carcass affords flexibility upon the tire, whereas the belt restrains the carcass and functions as a hoop.

Tires having excellent high speed performance have been demanded due to the propagation of high speed roads, and it is necessity to develop new materials for the belts. Although steel cords are mainly used for belts in conventional radial tires, cords have the great problems for tires required for high speed use. That is, since a radially outer growth of the tire becomes greater by centrifugal forces during turning at high speeds due to heavy steel cords, movement inside the tire becomes greater and rolling loss becomes greater. Further, such rolling loss causes heat generation, which results in fracture of the tire. Therefore, steel cord belts are not suitable for tires required to have high speed performance.

On the other hand, research of organic fibers have recently been remarkably advanced. Particularly, light fiber materials having the possibility of replacing the steel cords have appeared. Such fiber materials are produced by crystal spinning, super-drawing, gel spinning or the like, and have high strength and high modulus of elasticity. For examples, they are aramid fibers, carbon fibers, super high tenacity polyethylene fibers, high strength PVA fibers, polyoxymethylene fibers or whole aromatic polyester fibers. These fibers are about one fifth as heavy as the weight of the steel cords, but have strength and modulus of elasticity comparable to those of the steel cords.

However, the organic fibers are each constituted by a number of fine filaments. Therefore, when the organic fibers are used in the state that they are twisted and bundled same manner as in the conventional tire cords made of organic fibers, the modulus of elasticity in tension is lowered owing to twisting. Furthermore, since flexural rigidity and compression rigidity are low due to flexibility of fine filaments, rigidity of the belt in the radial tire decreases. Because of this, sufficient belt rigidity cannot be obtained unlike the case of the steel cords, so that cornering stability, high speed durability and wear resistance are deteriorated.

SUMMARY OF THE INVENTION

It is an object of the present invention to solve the above-mentioned problems, and to provide pneumatic radial tires having high speed performance, flexural fatigue resistance and cornering stability improved by using organic fibers as a material for belts.

The inventors have made strenuous studies to solve the above-mentioned problems, and found out that when organic fiber cords composed of a number of filaments are used as a material for the belt, a method to bundle the organic fibers by impregnating and attaching a resin to the cords without twisting bundles of the organic fibers is effective to enhance modulus in compression of the cords without decreasing the modulus in tension. However, the non-twisted fiber cords have poor fatigue resistance. In view of this, the inventors have further repeated strenuous studies to solve this problem, and found out that fiber cords having high modulus of elasticity and excellent flexural fatigue resistance can be obtained by making the sectional shape of the cords flat (elliptical or rectangular). The present invention has been accomplished based on the above knowledge.

That is, the present invention relates to pneumatic radial tires including one or more belt layers, wherein cords are used as cords for reinforcing at least one belt layer, the cords are formed by impregnating and attaching a resin having a modulus in tension of not more than 150 kg/mm² to bundles of cord-shaped fibers composed of a number of filaments having tensile strength of not less than 15 g/d and a fineness of 1-15 deniers, preferably 1-5 deniers, each of the bundles of the fibers being not twisted, an impregnated and attached amount of the filaments being in a range of 30% to 70 wt % relative to the weight of the filaments and resin, and each of the cords has an elliptical or rectangular cross-section shape having an aspect ratio of a major axis (b)/a minor axis (a) being 1.5 to 5.

The cord-like bundle of the fibers used in the present invention needs to have tensile strength of not less than 15 g/d. If it is less than 15 g/d, tenacity is insufficient for the belt, so that the amount of use of the cords in the belt must be unfavorably increased to supplement the tenacity. That is, if the use amount of the cords is increased, the space between the adjacent cords becomes narrower unless the number of the belt layers is increased. Consequently, strain of rubber between the cords increases, which causes heat generation and decreases the high speed durability.

Since the cord-like bundles of the filaments composed of a number of filaments are used in a non-twisted state, strain in the surface of the filaments on bending is large, so that if the fineness of each of the filaments exceeds 15 denier, fatigue resistance is deteriorated. To the contrary, if it is less than 1 denier, strength becomes small because of concentration of stress upon uneven portions of the filament, dust or micropores inside the filaments, etc. Thus, the denier of the filament is limited to 1 to 15 denier, preferably 1-5 denier.

The fibers, may include Aramid fibers, P.V.A. fibers, glass fibers and carbon fibers.

In the present invention, the resin is impregnated and attached among the filaments to bundle them.

The resin may be concretely made of thermosetting resins such as epoxy resin, unsaturated polyester resin, phenol resin, melamine resin, vinyl ester resin, polyimide resin, bismaleimide resin, Friedel-Crafts resin, furan resin, silicon resin and acryl resin, and thermoplastic resin such as 6,6-nylon, 6-nylon, polyester, polyether ether ketone, polycarbonate and polyacetal. A blend of two or more kinds of the thermosetting resins or two or more kinds of the thermoplastic resins or a blend of the thermosetting resin and the thermoplastic resin may be appropriately selected.

When the resin is hard and brittle in the form of a cured product, toughness is imparted upon the resin by using a resin denatured with an elastomer such as liquid rubber having acidic groups at terminals.

The impregnating resin used in the present invention needs to have modulus in tension of not more than 150 kgf/mm$^2$. If the tensile elasticity exceeds 150 kgf/mm$^2$, the cord will be bent locally due to poor flexibility, which results in fracture of the belt owing to concentration of deformation upon the bent portion.

The impregnated and attached amount of the resin is in a range of 30 to 70 wt % relative to the total weight of the filaments in the cord. If it is less than 30 wt %, the resin is not uniformly impregnated and attached among the filaments. If it is more than 70 wt %, the impregnated and attached amount is so great that the strength and the tensile rigidity of the belt cords are lowered.

Since the cord-like bundle of the fibers thus prepared is in a substantially non-twisted state. Therefore, it poses a problem with respect to flexural fatigue resistance. According to the present invention, in order to improve the flexural fatigue resistance, the cross-sectional shape of the resin-impregnated cord is made flat to mitigate the strain in the surfaces of the filaments on bending. The aspect ratio of the major axis (b)/minor axis (a) needs to be in a range of 1.5 to 5. If the aspect ratio is less than 1.5 while the same cross-sectional area of the cord is maintained, strain in the filaments of the cord cannot be greatly mitigated, and the flexural fatigue resistance cannot be improved. Now, consider the influence of the end count upon the tenacity. If the aspect ratio is not less than 5, the space between the adjacent cords is so narrow that the cords are likely to be separated from the rubber during formation of a tire (working prior to vulcanization), resulting in poor workability and poor productivity. More preferably, the aspect ratio is more preferably in a range of 1.5 to 3.

Depending upon the kind of the matrix resin, it may be that the cord is preliminarily treated with an aqueous solution of an epoxy resin, or bonding activity is imparted upon the surface of the cord by plasma treatment, corona discharge treatment or acid treatment, prior to the treatment with an RFL adhesive.

Further, a dry bonding system in which a formaldehyde generating agent such as resorcine or hexamethylene tetramine and silica is blended into a rubber composition to be coated onto the cord may be used as a bonding system. In this case, when the resin has good bondability, the step of treating the cord with the adhesive can be omitted.

Specific Examples of the present invention will be explained in more detail below together with comparative examples.

EXAMPLE 1 AND COMPARATIVE EXAMPLES 1 AND 2

In order to examine the relationship between the rigidity of the resin and the local flexural fracture of the cord, cords were prepared for belts in radial tires by impregnating and attaching a thermosetting resin composed mainly of bisphenol A-type epoxy resin to bundles of Kevlar fibers 3000 denier) manufactured by Du Pont de Nemours. The compounding recipe (weight part) and the curing conditions of the thermosetting resin is shown in Table 1.

TABLE 1

|  |  | Comparative Example 1 | Comparative Example 2 | Example 1 |
|---|---|---|---|---|
| Composition No. |  | 1 | 2 | 3 |
| Aspect ratio |  | 2.0 | 2.0 | 2.0 |
| Curing condition | Heat treating time at 150° C. | 15 | 15 | 20 |
| Recipe | Bisphenol A-type epoxy resin | 100 | 100 | 100 |
|  | Methylhexahydrophthalic anhydride | 80 | 80 | 80 |
|  | Carboxy-terminated.butadiene.acrylonitrile | — | 15 | 30 |
|  | Benzyldimethylamine | 1 | 1 | 1 |
| Impregnated-attached amount |  | 40 | 40 | 40 |
| Modulus in tension (kgf/mm$^2$)[1] |  | 320 | 240 | 145 |
| Fracture of cords in ∞-shaped turning test |  | fractured | fractured | not fractured |

[1]Measured according to ASTM D 638

EXAMPLES 2 TO 4 AND COMPARATIVE EXAMPLE 3

Examples 2 to 4 are cords prepared by using the same resin as in Example 1 except that the the aspect ratio of the sectional shape of the cords was varied by changing the shape of the die. By using the cords thus obtained, the relationship between the sectional shape of the bundles of the resin-impregnated fibers and the fatigue resistance was examined.

The size of the tires prepared is 195/70 HR 14 with a two belt layer construction, and the cords were arranged in two belt layers in a cross fashion between two layers, crossing at 20° relative to a circumferential direction of the tire, while the end count of the cords were varied depending upon the aspect ratio of the cords as shown in Table 2. A carcass had a two layer construction in which polyester cords having 100 d/2 polyester cords were used.

Tests were conducted by running each of the test tires having an internal pressure of 1.0 kg/cm$^2$ on a drum under a load of 600 kg over 10,000 km (60 km/hr). Then, a belt cord was cut and extracted, and its tenacity was measured. A tenacity-maintaining percentage was calculated as an index for fatigue by dividing a measured tenacity by that of a belt cord of the tire not run.

TABLE 2

|  | Comparative Example 3 (Conventional) | Example 2 | Example 3 | Example 4 | Example 5 |
| --- | --- | --- | --- | --- | --- |
| Aspect ratio (b/a) of cross-sectional shape of belt cord | 1 | 2 | 3 | 4 | 5 |
| End count of belt (number/5 cm) | 34 | 34 | 31 | 28 | 24 |
| Tenacity-maintaining percentage (%) | 60 | 85 | 90 | 93 | 95 |

It is seen from Table 2 that the belt cord in the resin-impregnated fiber bundle had a higher tenacity-maintaining percentage and better fatigue resistance in a flat shape of the cord as compared with the circular sectional shape of the aspect ratio b/a of b/a=1. Thus, it is seen that the practical range in the cross-sectional shape of the cord is in range of 1.5 to 5.

EXAMPLES 6-8 AND COMPARATIVE EXAMPLES 4-8

The sectional shape of a cord composed of a bundle of non-twisted aramide fibers prepared by impregnating and attached the resin shown in Table 1 was designed in a sectional shape with belt tenacity as shown in Table 3, and the belt cords were applied to a tire having a tire size of 195/70 HR 14. The tire had a two layer construction in which cords were arranged in a cross fashion between two layers at an end count of 34 per a width of 5 cm, crossing at 20° relative to the tire circumferential direction. A carcass had a two layer construction in which polyester cords having 1000 d/2 were used.

Conditions and details of items for evaluating performances of the tires are as follows:

TIRE ROLLING RESISTANCE (INDEX)

A test tire having an internal pressure of 1.70 kg/cm² was placed on a drum having an outer diameter of 1,708 mm, and a 100% load was applied to the tire according to JIS D 4202.

Then, the tire was preliminarily run at 80 km/hr for 30 minutes. After the pneumatic pressure was adjusted again, the rpm of the drum was increased to 200 km/hr, and the tire was left to drift. Rolling resistance was calculated from an inertia moment until the rpm of the drum was decreased to 20 km/hr from 185 km/hr.

Tire rolling resistance =

$$\frac{ds}{dt}\left(\frac{ID}{RD^2} + \frac{It}{Rt^2}\right) - \text{resistance of drum alone}$$

in which ID and It are inertia moments of the drum and the tire, respectively, and RD and Rt are the radian of the drum and the tire, respectively.

The rolling resistance at the speed of 50 km/hr was obtained as a representative value. The above measurement was effected in a room controlled to a surrounding temperature of 24°±2°. The result was shown by index according to the following expression:

Rolling resistance of Test tire was expressed by index according to the following expression:

$$\text{Rolling resistance} = \frac{(\text{representing value of control tire} - \text{representing value of test tire})}{\text{representing value of control tire}}$$

The smaller the rolling resistance the larger the index, and therefore the more excellent the fuel consumption performance.

Tire in Comparative Example 4 was used as Control tire.

CORNERING STABILITY (INDEX)

Cornering stability was evaluated by index in feeling test with a test driver by taking a result in Control tire (Comparative Example 4) as 100. The greater the index, the better the result.

EIGHT-SHAPED TURNING TEST

An eight-shaped turning test was conducted along an eight figure curve by using an automatic driving unit. After the tire was run for 300 laps, the tire was decomposed, and the number of the bent cords in the belt layer was counted.

The number of the cords in the belt layer in Control tire (Comparative Example 4) was counted, and those in tires in Examples 7-9 and Comparative Examples 5 and 6 were also counted. Results in the ∞-shaped turning test were indicated by index according to the following equation:

$$\frac{\text{number of bent cords in control tire}}{\text{number of bent cords in test tire}} \times 100$$

The results obtained are shown in Table 3.

TABLE 3

|  | Comparative Example 4 | Example 6 | Example 8 | Example 5 | Comparative Example 5 | Comparative Example 6 |
| --- | --- | --- | --- | --- | --- | --- |
| Index of belt tenacity | 100 | 100 | 100 | 80 | 100 | 100 |
| Impregnating resin composition No. | 2 | 3 | 3 | 3 | 1 | 1 |
| Aspect ratio of sectional shape of resin-impregnated cord (b/a) | 1 | 3 | 2 | 4 | 1 | 2 |
| Cornering stability (index) | 100 | 100 | 105 | 107 | 100 | 105 |

TABLE 3-continued

|  | Comparative Example 4 | Example 6 | Example 8 | Example 5 | Comparative Example 5 | Comparative Example 6 |
| --- | --- | --- | --- | --- | --- | --- |
| Rolling resistance (index) | 100 | 105 | 111 | 110 | 103 | 106 |
| High speed durability (index) | 100 | 107 | 115 | 103 | 105 | 108 |
| Fracture of cords in ∞-shaped turning test (index) | 100 | 102 | 108 | 105 | 92 | 95 |

The following are confirmed from the test results shown in Table 3.

The cornering stability in the case of the belt cords according to the present invention is comparable to the case of the steel cords, and the cornering stability tends to be improved by increasing the aspect ratio of (b)/(a). This is because the resin-impregnated cords are unlikely to be deformed by side forces.

The rolling resistance in the case of the belt cords according to the present invention is comparable to the case of the steel cords, and the larger the aspect ratio (b)/(a), the smaller the amount of the covering rubber.

When the aspect ratio of (b)/(a) is increased, the use amount of the covering rubber is decreased, and deformation with centrifugal forces is lessened. Thus, the high speed durability is improved.

The fracture of the cords in the ∞-shaped turning test in the case of the belt cords according to the present invention is smaller in each Example as compared with the case of the steel cords. The larger the aspect ratio (b)/(a) of the cross-sectional shape of the cord, the more the strain is mitigated in the surface of the cord and the more difficult the bending of the cords. When the amount of the resin impregnated and attached into the cord is more than 150 kg/mm$^2$, the frequency of the fracture due to the bending increases.

As having been explained above, according to the present invention, when the organic fiber cords composed of a number of filaments are to be used as a material for the belt, the resin is impregnated and attached to the bundle of the organic fibers without twisting the cord, and the sectional shape of the cords is made flat. Thereby, the high speed performances, flexural fatigue resistance and cornering stability can be improved.

What is claimed is:

1. A pneumatic radial tire including one or more belt layers, wherein cords are used as cords for reinforcing at least one belt layer, the cords formed by impregnating and attaching an epoxy thermosetting resin having a modulus in tension of less than 150 kg/mm$^2$ to bundles of cord-like Aramid fibers composed of a number of filaments having tensile strength of not less than 15 g/d and a fineness of 1–15 deniers, each of the bundles of the Aramid fibers being not twisted, an impregnated and attached amount of the filaments being in a range of 30% to 70 wt % relative to an weight of the filaments and resin, and each of the cords has an elliptical or rectangular cross-sectional shape having an aspect ratio of a major axis (b)/a minor axis (a) being 1.5 to 5.

2. The pneumatic tire of claim 1, wherein said aspect ratio of a major axis (b)/a minor axis (a) is 1.5 to 3.0.

* * * * *